H. J. HERNSHEIM.
NON-SKIDDING DEVICE.
APPLICATION FILED OCT. 8, 1912.
1,071,418. Patented Aug. 26, 1913.
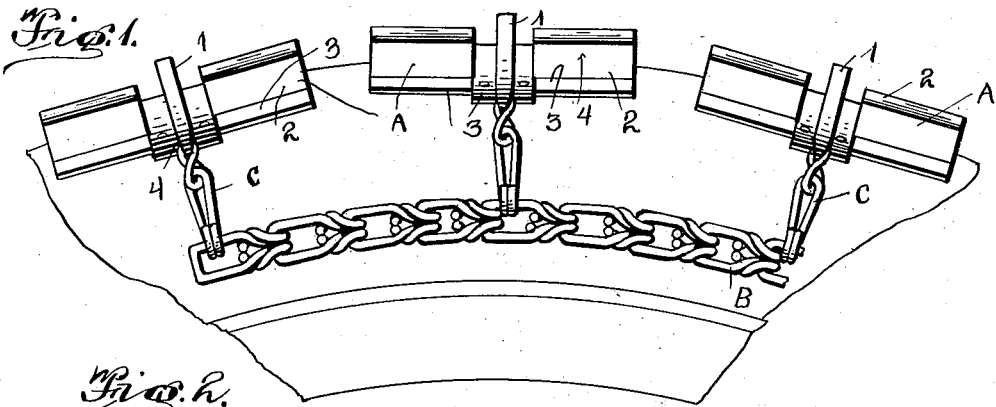
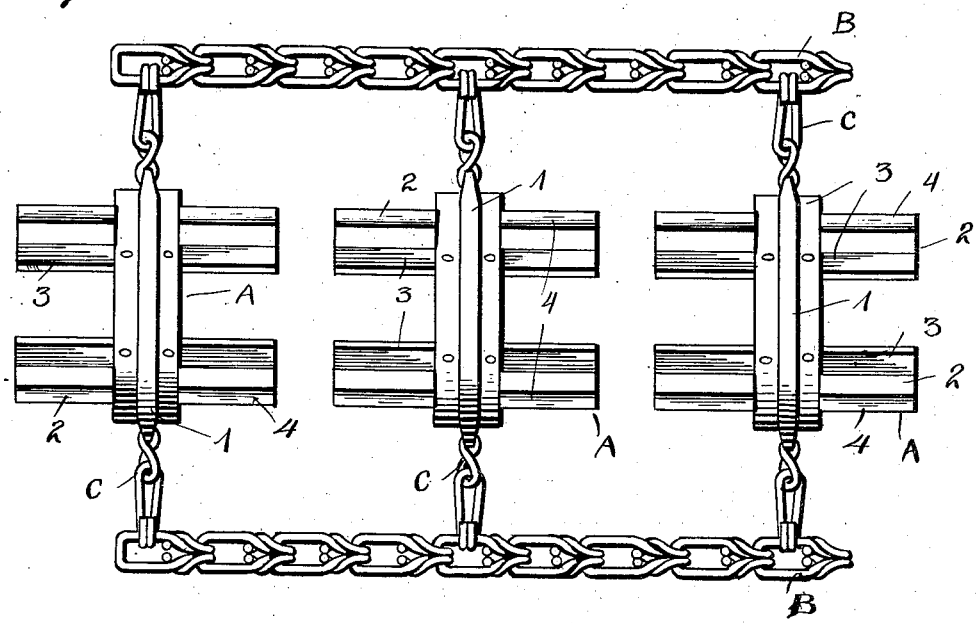
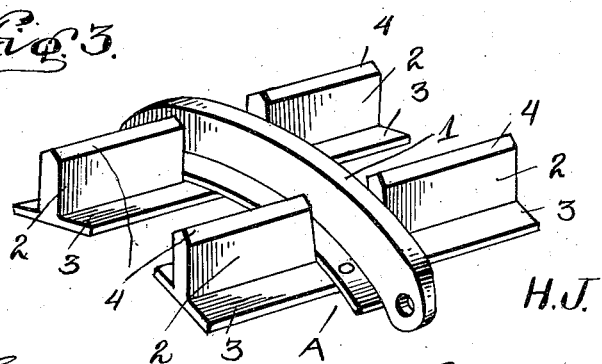
Witnesses
Ernest Crocker
P. M. Smith
Inventor
H. J. Hernsheim
By Victor J. Evans
Attorney

UNITED STATES PATENT OFFICE.

HARRY J. HERNSHEIM, OF PLEASANT PRAIRIE, WISCONSIN.

NON-SKIDDING DEVICE.

1,071,418. Specification of Letters Patent. Patented Aug. 26, 1913.

Application filed October 8, 1912. Serial No. 724,574.

*To all whom it may concern:*

Be it known that I, HARRY J. HERNSHEIM, citizen of the United States, residing at Pleasant Prairie, in the county of Kenosha and State of Wisconsin, have invented new and useful Improvements in Non-Skidding Devices, of which the following is a specification.

This invention relates to anti-skidding devices for use upon the wheels of automobiles, motor trucks, and other self-propelled vehicles, the object in view being to provide what is ordinarily known as an anti-skidding chain, embodying novel construction of anti-skid units connected up by chains arranged at opposite sides thereof adapting the device as a whole to be applied to the tire of a wheel, the device serving in a double capacity, in that it provides for the necessary traction of the wheel and also prevents lateral or side skidding.

The device is designed for use upon slippery roads, and may be easily applied to and removed from a whel, as may be found necessary.

With the above and other objects in view, the invention consists in the construction, combination and arrangement of parts, as will be hereinafter more fully described, illustrated in the accompanying drawings, and pointed out in the claim hereunto appended.

In the drawings: Figure 1 is a side elevation of a portion of a wheel showing the anti-skid device applied thereto. Fig. 2 is an enlarged plan view of several connected units. Fig. 3 is a perspective view of one unit.

The anti-skidding device contemplated in this invention comprises a continuous series of anti-skid units A connected together by parallel side chains B, said chains being indirectly connected to the units by short transverse chains or flexible connections C which facilitate applying the device as a whole to a tire and removing the same therefrom.

Each anti-skid unit A comprises a central traction rib 1, extending transversely of the tire, when in place thereon, to give the necessary tractive properties to the wheel. In addition to the central traction rib 1, each unit comprises sets of parallel anti-skid ribs 2 arranged at opposite sides of the central traction rib and parallel or substantially so to each other, and out of contact with the central rib, so as to allow ice, mud and the like to escape from between the ribs to prevent clogging the device as a whole, and to keep the same in perfect operative condition at all times. The unit as a whole is preferably formed in one piece, and made from a drop forging, and in the formation of the unit, all of the ribs are provided with relatively wide or broad base flanges 3, thereby avoiding any possibility of injury to that portion of the tire with which the unit comes in contact.

It will be observed that the ribs 2 extend perpendicularly to the central traction rib 1, and terminate at their inner ends at a distance from said central rib, in order to provide for the clearance spaces at the points 4, for the purpose above stated.

By forming the unit in the manner above described, it may be made very light and strong. The outer edges of the ribs may be sharpened to obtain a firm hold on the roadway, and to bite into the same, if desired, and other modifications of a similar nature may be resorted to by the manufacturer, without departing from the principle or sacrificing any of the advantages of the invention.

What is claimed is:

An anti-skid unit, comprising a base shaped in plan to resemble the letter H, said unit embodying a central traction rib projecting from the base and extending transversely with relation to the tread surface of the tire, and sets of parallel anti-skid ribs also projecting from the base and arranged at the front and rear of the traction rib and in spaced relation thereto and to each other, said anti-skid ribs extending circumferentially of the tread surface of the tire.

In testimony whereof I affix my signature in presence of two witnesses.

HARRY J. HERNSHEIM.

Witnesses:
W. H. PURNELL,
CHAS. C. BROWN.